(12) United States Patent
Xing et al.

(10) Patent No.: US 6,518,217 B2
(45) Date of Patent: Feb. 11, 2003

(54) METHOD OF PREPARING OF NANOMETER ELECTROCATALYST FOR PROTON EXCHANGE MEMBRANE FUEL CELL

(75) Inventors: Wei Xing, Changchun (CN); Rongbing Du, Changchun (CN); Tianhong Lu, Changchun (CN)

(73) Assignee: Changchun Institute of Applied Chemistry, Chinese Academy of Sciences, Changchun (CN)

( * ) Notice: Subject to any disclaimer, the term of this patent is extended or adjusted under 35 U.S.C. 154(b) by 0 days.

(21) Appl. No.: 09/932,048

(22) Filed: Aug. 17, 2001

(65) Prior Publication Data
US 2002/0177525 A1 Nov. 28, 2002

(30) Foreign Application Priority Data
May 25, 2001 (CN) .......................... 01118253 A

(51) Int. Cl.⁷ .......................... B01J 27/13; B01J 21/18; B01J 27/06; H01M 4/88; H01M 4/86
(52) U.S. Cl. .................. 502/230; 502/101; 502/181; 502/185; 429/40
(58) Field of Search .................. 429/40; 502/101, 502/181, 185, 230

(56) References Cited

U.S. PATENT DOCUMENTS 3,709,834 A * 1/1973 Fukuda et al. .............. 252/470
4,031,292 A * 6/1977 Hervert ....................... 429/40
4,039,409 A * 8/1977 LaConti et al. ............. 204/129
4,090,978 A * 5/1978 Welsh et al. ............. 252/425.3
6,326,098 B1 * 12/2001 Itoh et al. ..................... 429/40

* cited by examiner

Primary Examiner—Mark L. Bell
Assistant Examiner—Patricia L. Hailey
(74) Attorney, Agent, or Firm—Knobbe, Martens, Olson & Bear LLP

(57) ABSTRACT

The present invention relates a method for preparing nanometer electrocatalyst for proton exchange membrane fuel cells, comprising the steps of: 1) adding in water a platinum halogen compound or a mixture of a platinum halogen compound and a ruthenium halogen compound, and active carbon, the amount of noble metal in the solution is 0.5–10 g/L, and the amount of active carbon is 0.05–2 g/L; 2) adjusting the pH of the solution to 2.5–10.5 with potassium hydroxide and/or ammonium hydroxide; 3) adding dropwise a reducing agent to an amount of 2.5 to 5 times in excess of that of the noble metal in moles, and allowing the reduction reaction to proceed; 4) filtering off the liquid and washing the remains; and 6) drying the remains. The catalysts prepared by the present invention have uniform particle sizes in the range of 4±0.5 nm, and superior electrochemical properties.

6 Claims, No Drawings

METHOD OF PREPARING OF NANOMETER ELECTROCATALYST FOR PROTON EXCHANGE MEMBRANE FUEL CELL

This application claims priority under 35 U.S.C. §119(a) from Chinese Application No. 01118253.9, filed May 25, 2001.

FIELD OF THE INVENTION

The present invention relates to a method for preparing highly active electrocatalyst of proton exchange membrane fuel cells.

BACKGROUND OF THE INVENTION

Proton exchange membrane fuel cell is a new type device for directly converting chemical energy into electrical energy. Due to the absence of rotating parts and combustion, the efficiency of energy conversion is not limited by Carnot cycle. By utilizing neat energy sources such as hydrogen, methanol and the like, no sulfur oxide and nitrogen oxide will be resulted, thus causing no environmental pollution. It is especially suitable to be used as movable electric sources and is useful for electric vehicles. With the advancement of technology, it gets more and more desirable to be industrialized. One of the main materials for such a device is the electrocatalyst, since its activity is directly related to the performance of the fuel cell. The catalyst produced by E-TEK Co. is one of the best commercialized catalysts having high ratio of activity to the amount of noble metals to be used. In laboratory, the catalyst is generally prepared by chemical reduction and the properties of the catalyst thus obtained depend significantly on the method of preparation. (1) Impregnation method is the most commonly used method for the preparation of supported metal catalyst (J. B. Goodenough, A. Hamnett, B. J. Kennedy, ETC. Elctrochimica Acta, Vol 15, No.1 pp. 199–207, 1990). The method comprises the step of putting the supporting material into a metal salt solution until thoroughly soaked, and then adding a reducing agent to reduce metal ions. This method takes advantage of capillary effect which enables the liquid to be diffused into the inner cavities of the supporting material. The active components dissolved in the liquid will then be adsorbed by the supporting material. Thus, the ability of the active components to be absorbed on the supporting material will play an important role on the property of the catalyst. (2) Metal vapor method (Wu Shihua, Yang Shujun and Wang Xukun et al., Petroleum Chem. Eng. (in Chinese) 18 (6), 361, 1989) comprises the step of vaporizing the metal, and then depositing the metal onto the surface of the supporting material. By this way, a catalyst with fine metal particulate and high activity is obtained. However, the method needs to use costly equipment and is difficult to produce on an industrial scale. (3) Redox method (Masahiro Watanabe, Makoto Uchida, Satoshi Motoo, J. Electroanal. Chem. 229 (1987) 395–406) comprises the step of forming a coordination compound from a metal ion and a ligand ion at reduced state, then adding an oxidant, an oxidized ligand and a metal ion to form a metastable solution, and finally adding the supporting material under suitable conditions to allow metal to be deposited on the supporting material. Catalysts thus prepared have uniform particle size and finer metal particulate. However, this method is time consuming. (4) Nanometer metal cluster synthesis method is a new method (T. J. Schmidt, M. Noeske, H. A. Gasteiger, R. J. Behm, J. Electrochem. Soc., Vol. 145, No. 3, March 1998), in which metal ions react with reducing agent in a suitable organic phase in the presence of stabilizer to form a nanometer metal cluster. Supporting material is then added to adsorb the formed metal clusters. Particle size of the metal catalyst prepared by this method is relative small, but the reaction condition of this method is quite critical. It is believed that a catalyst with excellent electrochemical activity could be obtained only when the platinum micro particles are non-crystalline and their sizes are about 4 nm (Masahiro Watanabe, Makoto Uchida, Satoshi Motoo, J. Electroanal. Chem. 229 (1987) 395–406). Owing to the adsorption equilibrium, the noble metals in the solution will firstly be reduced and the adsorption equilibrium will be shifted to the liquid phase. This results in desorption of the adsorbed noble metal. As a matter of fact, the main part of the noble metal is reduced in liquid phase. Coagulation of metal particles will definitely occur. As a result, homogeneity of the product decreases and the metal is poorly supported by active carbon.

DISCLOSURE OF THE INVENTION

The object of the present invention is to provide a method for preparing a nanometer electrocatalyst for proton exchange membrane fuel cells. By controlling the adsorption of noble metal by active carbon, noble metal catalysts with preferable particle size and crystalline state are obtained. The drawbacks of the above-mentioned methods are thus overcome.

There is provide a method for preparing a nanometer electrocatalyst for proton exchange membrane fuel cells, comprising the steps of:

1) adding in water a platinum halogen compound or a mixture of a platinum halogen compound and a ruthenium halogen compound, and active carbon, making the amount of noble metal in the solution in the range of 0.5–10 g/L, and the amount of active carbon in the range of 0.05–2 g/L;

2) adjusting the pH of the solution to 2.5–10.5 with potassium hydroxide and/or ammonium hydroxide;

3) adding dropwise a reducing agent to an amount of 2.5 to 5 times in excess of that of the noble metal in moles, and allowing the reduction reaction to proceed;

4) filtering off the liquid and washing the remains; and 6) drying the remains.

The platinum halogen compound and ruthenium halogen compound used in the method of the present invention is a compound containing platinum or ruthenium and halogen, such as platinum halide or ruthenium halide or their salt. The platinum or ruthenium ion may be a divalent or tetravalent ion. The compound may be a chloride, a bromide or an iodide. Preferably, the compound is a chloride, such as sodium chloroplatinate, sodium chlororuthenate, potassium chloroplatinate, potassium chlororuthenate, sodium chloroplatinite, sodium chlororuthenite, potassium chloroplatinite or potassium chlororuthenite. When a mixture of a platinum halogen compound and a ruthenium halogen compound is used, the molar ratio of platinum to ruthenium is 1:0.2–1.

The alkali used to adjust the pH of the solution of the raw materials is potassium hydroxide and/or ammonium hydroxide, and this is important to control the specific state of adsorption.

The reducing agent used in the method of the present invention may be aqueous solution of hydrazine hydrate, sodium borohydride, hydrogen and/or formic acid. The reduction reaction can be carried out at 0–70° C., preferably at 50–65° C., with a time of more than 15 minutes, preferably more than 30 minutes, and most preferably for about 1 hour. Preferably, the reducing agent is added dropwise with stirring.

When the reduction reaction is finished, lower the temperature of the solution to room temperature, filter off the liquid and wash the precipitate until no halogen ion can be detected. The product can be dried at 60–80° C. in vacuum. By this way, a nanometer active carbon supported noble metal catalyst with particle size of 4±0.5 nm can be finally obtained.

When the catalysts prepared by this invention were compared with those of E-TEK, it was found that the catalytic activity to oxidation reaction of methanol and hydrogen is significantly increased. It can be seen from the oxidation polarization curve that under identical oxidation reaction current density, the initial potential E for the methanol oxidation is 110 mV more negative, showing that the activation energy of the catalysts of the present invention to the methanol oxidation is significantly lowered. This provides a room for improvement of 110 mV on cell's total working voltage. It was demonstrated that DMFC assembled with the catalyst of the present invention have a voltage 100 mV higher than that assembled with E-TEK catalysts under the same current density. The X-ray diffraction pattern of the crystals of the catalyst of the present invention and that of E-TEK demonstrated that they have a lower degree of crystallinity of metal platinum, and have lower and broader diffraction peaks of metal platinum. Lower degree of crystallinity means that the catalyst contains less platinum crystals and more active sites on the platinum surface. Therefore it has higher catalytic activity. High resolution electron microphotograph showed that the nanometer catalysts prepared by the present invention are non-crystalline with particle size in the range of 4±0.5 nm.

The product obtained by the method of the present invention is specifically suitable for the preparation of catalysts for direct methanol proton exchange membrane fuel cell. The present invention will be described in further detail in the following Examples.

EXAMPLE 1

0.05 g active carbon was added into twice distilled water to form 1 liter of suspension. The resulted suspension was stirred and heated to 50° C. A chloroplatinic acid solution was added dropwise, to obtain a solution in which the concentration of platinum is 5 g/l. The solution stood for 1 hr to allow adsorption of the materials on active carbon. The pH of the solution was adjusted to 7.5 with aqueous solution of potassium hydroxide/ammonium hydroxide, and then the suspension was stirred for 30 minutes. 1 g of sodium borohydride was added, and the temperature was kept at 20° C. until the active carbon phase precipitated and the solution phase turned to colorless. After the temperature was lowered to room temperature, the liquid was filtered off and the active carbon supporting the reduced metal was washed with hot water for several times until no Cl⁻ can be detected. The product was dried at 60° C. in vacuum and a single-component electrocatalyst for proton exchange membrane fuel cell was obtained. The platinum particles in the catalyst are non-crystalline and have a particle size in the range of 4±0.5 nm.

EXAMPLE 2

The process of Example 1 was carried out, except that platinum concentration was changed to 0.5 g/l, pH was changed to 10.5, the reducing agent used was 0.25 g hydrazine hydrate, and the reaction temperature was 60° C. The final product is a single-component anode catalyst for hydrogen oxidation reaction.

EXAMPLE 3

The process of Example 1 was carried out, except that an aqueous solution of ammonium hydroxide is used to adjust the pH to 7.0, and the concentration of platinum was 5 g/l. Reduction reaction was carried out at 0° C. under constant hydrogen bubbling. A single-component catalyst for methanol oxidation was obtained. The platinum particles in the catalyst is non-crystalline and have a particle size of 4±0.5 nm.

EXAMPLE 4

The process of Example 1 was carried out, except that an aqueous solution of chloroplatinic acid/chlororuthenic acid is used with a molar ratio of platinum/ruthenium at 1:0.5 and ruthenium concentration at 5 g/l. 2.5 g of hydrazine hydrate was used as reducing agent. A binary catalyst with high catalytic activity was obtained. Comparing with E-TEK catalyst under identical oxidation reaction current density, the catalyst has an initial potential 110 mV more negative for methanol oxidation.

EXAMPLE 5

The process of Example 4 was carried out, except that an aqueous solution of potassium hydroxide was used to adjust the pH to 2.5. The aqueous solution of chloroplatinous acid/chlororuthenous acid used has a molar ratio of platinum/ruthenium at 1:0.2 and ruthenium concentration at 0.5 g/l. Continuously fed hydrogen was used as reducing agent. Reduction reaction was carried out at 0° C. A binary catalyst with high catalytic activity was obtained. Comparing with E-TEK catalyst under the same oxidation reaction current density, the catalyst has an initial potential E 100 mV more negative for methanol oxidation.

EXAMPLE 6

The process of Example 1 was carried out, except that an aqueous solution of potassium hydroxide was used to adjust the pH to 5. The concentration of platinum and ruthenium was 10 g/l and the molar ratio of platinum/ruthenium was 1:0.5. 12 g of formic acid was used as reducing agent. Reduction reaction was carried out at 40° C. A binary catalyst with high catalytic activity was obtained. Comparing with E-TEK catalyst under identical oxidation reaction current density, the catalyst has an initial potential E 105 mV more negative for methanol oxidation.

EXAMPLE 7

The process of Example 4 was carried out, except that an aqueous solution of ammonium hydroxide was used to adjust the pH to 6.8. The aqueous solution of chloroplatinic acid/chlororuthenic acid used has a molar ratio of platinum/ruthenium at 1:1 and a concentration of platinum and ruthenium at 5 g/l. Bubbling hydrogen was used as reducing agent. Reduction reaction was carried out at 40° C. A binary catalyst with high catalytic activity for hydrogen oxidation was obtained. An hydrogen/oxygen fuel cell was assembled by using the catalyst, and the performance was compared with one assembled by using E-TEK catalyst. The working voltage was raised by 80 mV under the same working current density.

EXAMPLE 8

The process of Example 4 was carried out, except that an aqueous solution of ammonium hydroxide was used to adjust the pH to 7.5. The aqueous solution of bromoplatinic acid/bromoruthenic acid used has a concentration of platinum and ruthenium at 2 g/l. 0.6 g sodium borohydride was used as reducing agent. Reduction reaction was carried out at 30° C. A binary alloy catalyst with high catalytic activity for hydrogen oxidation was obtained. An hydrogen/oxygen fuel cell was assembled by using the catalyst, and the performance was compared with one assembled by using E-TEK catalyst. The working voltage was raised by 80 mV under the same working current density.

EXAMPLE 9

The process of Example 4 was carried out, except that an aqueous solution of ammonium hydroxide is used to adjust the pH to 8.5. The aqueous solution of sodium bromoplatinite/sodium bromoruthenite used has a concentration of platinum and ruthenium at 1 g/l. 1.2 g of formic acid was used as reducing agent. Reduction reaction was carried out at 50° C. A binary catalyst with high catalytic activity for hydrogen oxidation was obtained. An hydrogen/oxygen fuel cell was assembled by using the catalyst, and the performance was compared with one assembled by using E-TEK catalyst. The working voltage was raised by 80 mV under the same working current density.

EXAMPLE 10

The process of Example 4 was carried out, except that an aqueous solution of ammonium hydroxide was used to adjust the pH to 10.5. The aqueous solution of iodoplatinic acid/iodoruthenic acid used has a molar ratio of platinum/ruthenium at 1:0.2 and the concentration of platinum and ruthenium at 7 g/l. 6 g of formic acid was used as reducing agent. Reduction reaction was carried out at 40° C. A binary catalyst with high catalytic activity for hydrogen oxidation was obtained. An hydrogen/oxygen fuel cell was assembled by using the catalyst, and the performance was compared with one assembled by using E-TEK catalyst. The working voltage was raised by 80 mV under the same working current density.

EXAMPLE 11

The process of Example 4 was carried out, except that an aqueous solution of ammonium hydroxide was used to adjust the pH to 6.5. An aqueous solution of sodium iodoplatinate/sodium ruthenite with the concentration of platinum and ruthenium at 8 g/l was used. 6 g of formic acid was used as reducing agent. Reduction reaction was carried out at 70° C. A binary catalyst with high catalytic activity for hydrogen oxidation was obtained. An hydrogen/oxygen fuel cell was assembled by using the catalyst, and the performance was compared with one assembled by using E-TEK catalyst. The working voltage was raised by 80 mV under the same working current density.

EXAMPLE 12

The process of Example 4 was carried out, except that an aqueous solution of ammonium hydroxide was used to adjust the pH to 10.5. An aqueous solution of sodium iodoplatinite/sodium iodoruthenite with the concentration of platinum and ruthenium at 7 g/l was used. 4.5 g of formic acid was used as reducing agent. Reduction reaction was carried out at 50° C. A binary catalyst with high catalytic activity for hydrogen oxidation was obtained. An hydrogen/oxygen fuel cell was assembled by using the catalyst, and the performance was compared with one assembled by using E-TEK catalyst. The working voltage was raised by 80 mV under the same working current density.

EXAMPLE 13

The process of Example 4 was carried out, except that an aqueous solution of ammonium hydroxide was used to adjust the pH to 10.5. The concentration of platinum and ruthenium was at 10 g/l. 8 g of hydrazine hydrate was used as reducing agent. Reduction reaction was carried out at 65° C. A binary catalyst with high catalytic activity for hydrogen oxidation was obtained. An hydrogen/oxygen fuel cell was assembled by using the catalyst, and the performance was comparied with one assembled by using E-TEK catalyst. The working voltage was raised by 80 mV under the same working current density.

EXAMPLE 14

The process of Example was carried out, except that an aqueous solution of ammonium hydroxide was used to adjust the pH to 9.5. The chloroplatinic acid/chlororuthenic acid solution was added while stirring. The concentration of platinum and ruthenium was at 8 g/l. 4 g of hydrazine hydrate was used as reducing agent. Reduction reaction was carried out at 65° C. A binary catalyst with high catalytic activity for methanol and hydrogen oxidation was obtained. Compared with E-TEK catalyst under identical oxidation reaction current density, the catalyst has an initial potential E about 100 mV more negative for methanol oxidation.

EXAMPLE 15

The process of Example 4 was carried out, except that an aqueous solution of ammonium hydroxide was used to adjust the pH to 9.0. The chloroplatinic acid/chlororuthenic acid solution was added while stirring. The concentration of platinum and ruthenium was at 8 g/l. 8 g of hydrazine hydrate was used as reducing agent. Reduction reaction was carried out at 55° C. A binary catalyst with high catalytic activity for methanol and hydrogen oxidation was obtained. Compared with E-TEK catalyst under identical methanol oxidation current density, the catalyst has an initial potential E approximately 100 mV more negative for methanol oxidation.

What is claimed is:

1. A method for preparing nanometer electrocatalyst for proton exchange membrane fuel cells, comprising the steps of:
   1) adding in water a platinum halogen compound or a mixture of a platinum halogen compound and a ruthenium halogen compound, and active carbon, making the amount of noble metal in the solution in the range of 0.5–10 g/L, and the amount of active carbon in the range of 0.05–2 g/L;
   2) adjusting the pH of the solution to 2.5–10.5 with potassium hydroxide and/or ammonium hydroxide;
   3) adding dropwise a reducing agent to an amount of 2.5 to 5 times in excess of that of the noble metal in moles, and allowing the reduction reaction to proceed;
   4) filtering off the liquid and washing the remains; and
   6) drying the remains.

2. A method according to claim 1, wherein the platinum halogen compound and ruthenium halogen compound is selected from the group consisting of sodium chloroplatinate, sodium chlororuthenate, potassium chloroplatinate, potassium chlororuthenate, sodium chloroplatinite, sodium chlororuthenite, potassium chloroplatinite and potassium chlororuthenite.

3. A method according to claim 1, wherein the mixture of a platinum halogen compound and a ruthenium halogen compound has a molar ratio of platinum to ruthenium of 1:0.2–1.

4. A method according to claim 1, wherein the reducing agent is selected from the group consisting of hydrazine hydrate, sodium borohydride, hydrogen, formic acid and a mixture thereof.

5. A method according to claim 1, wherein the reduction reaction is carried out at 0–70° C.

6. A method according to claim 1, wherein the reduction reaction is carried out for more than 15 minutes.

* * * * *